United States Patent
White (10) Patent No.: US 6,839,484 B2
(45) Date of Patent: Jan. 4, 2005

(54) OPTICAL FIBER FOR SINGLE-MODE OPERATION

(75) Inventor: Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 80 days.

(21) Appl. No.: 10/407,376

(22) Filed: Apr. 4, 2003

(65) Prior Publication Data

US 2004/0197062 A1 Oct. 7, 2004

(51) Int. Cl.$^7$ .............................. G02B 6/28; G02B 6/02
(52) U.S. Cl. ..................................... 385/29; 385/124
(58) Field of Search .............................. 385/123–124, 385/27–29

(56) References Cited

U.S. PATENT DOCUMENTS

| | | | |
|---|---|---|---|
| 3,966,446 A | 6/1976 | Miller | |
| 4,038,062 A | 7/1977 | Presby | |
| 4,641,914 A | * 2/1987 | Sheem | ........................ 385/29 |
| 6,131,415 A | 10/2000 | Chang | |
| 6,205,268 B1 | 3/2001 | Chraplyvy | |

* cited by examiner

Primary Examiner—Frank G. Font
Assistant Examiner—Erin D. Chiem (57) ABSTRACT

A single-mode fiber of increased core size consists of a "few-mode" fiber, of core size sufficient for guiding up to three high-order modes in addition to the fundamental mode, by interposing perturbations of such spacing along the fiber, as to selectively couple any such high-order modes to (unguided) cladding modes, thereby rejecting all but the fundamental mode. Unwanted coupling of the fundamental mode, leading to added fiber loss, is minimized by appropriate refractive index profile design.

20 Claims, 4 Drawing Sheets

OPTICAL FIBER FOR SINGLE-MODE OPERATION

FIELD OF THE INVENTION

Optical fiber communications.

BACKGROUND OF THE INVENTION

In a period of three decades, optical fiber has displaced copper wire as the transmission medium of choice for long distance communications. Production, now multi-national, is at a rate of millions of kilometers per year. Indications are that use will continue to expand, beyond terrestrial and underwater long distance, to medium distance and to local usage including "fiber to the home". General acceptance of digital communications has furthered use of fiber for transmission of picture and data as well as for voice.

For many purposes, the initially introduced multimode fiber has been supplanted by single-mode fiber with substantial improvement in bandwidth. Recent advances in fiber design have, for the most part, been directed to single-mode operation. Needed small core size, and related small mode field size, however, complicate fabrication as well as installation and operation of commercial single-mode fiber. In manufacture, small core size is responsible for tightened factory specifications which impact yield. In installation, small core size makes splicing more difficult. In operation, resulting small mode field radius (MFR) and associated large signal density increases consequences of nonlinearities. Since a larger fraction of the power constituting the single-mode pulse now travels in the cladding, macrobending loss becomes more of a concern, with implications on allowable bend radius.

While broadly recognized, little progress has been made toward alleviating difficulties associated with small core size. The direct approach is not being pursued—accommodation of increased core size, in fiber of otherwise conventional design, requires reduction in guide strength if single-mode operation is to be assured. This results in both increased microbending loss and increased cabling loss.

Multimode fiber, despite decreased bandwidth, continues to serve in niche positions, in part because of its larger core size. Associated decreased bandwidth is due to differential mode delay as among the components of the multimode pulses generally constituting the transmitted signal. The origin of the problem—conversion of laser-generated, single-mode light pulses into multimode pulses by fiber imperfections—has defied correction.

One approach to increased bandwidth in multimode fiber is based on increased, rather than reduced, incidence of mode conversion events. Work by S. E. Miller, U.S. Pat. No. 3,966,446 issued Jun. 29, 1976, teaches periodically perturbing the fiber along its length, thereby supplementing mode conversion events due to chance imperfections. The patent objective is to provide deliberate changes in effective index-of-refraction experienced by guided light, thereby facilitating mode coupling. The resulting increase in the number of mode coupling events, experienced by contributing photons, translates into many mode-to-mode conversions, thereby averaging detection arrival time and reducing pulse spreading. The approach was effective. Miller's illustrative method of perturbing the fiber preform ultimately led to techniques for perturbing the drawing or already-drawn fiber. H. M. Presby, U.S. Pat. No. 4,038,062, issued Jul. 26, 1977, teaches one such method, in accordance with which output from a pulsating heat source—a small flame jet or laser—is directed against the fiber during drawing, in order to "perturb" axial alignment and/or diameter. More recent work substitutes perturbations constituted of thickness variations in the fiber coating.

Unfortunately, this line of effort has, until now, led to significantly added fiber loss. Wanted coupling of bound modes has been accompanied by direct or stepwise coupling to leaky (unguided) cladding modes, with consequent added loss sufficient to disqualify the approach.

Co-pending patent application "Enhanced Multimode Fiber," Ser. No. 10/408,076, filed on even date herewith and assigned to the assignee of this application, is directed to a perturbed multimode fiber without usually associated added loss. In accordance with the co-pending application, a variation or "discontinuity" in fiber index profile selectively changes effective index for particular mode(s), thereby enabling decoupling of cladding modes, and lessening associated radiation loss.

SUMMARY OF THE INVENTION

The inventive advance is single-mode fiber of larger core size than that of conventional design—a fiber of core size sufficient to support higher-order linearly polarized modes in addition to the fundamental mode—now provided with inherent means for continuously stripping such higher-order modes as are generated, thereby leaving only the fundamental mode and so assuring single-mode operation.

The invention takes advantage of the loss mechanism, which has plagued effort on perturbed multimode fiber, to assure single-mode behavior in a "few-mode" fiber core—in a core of sufficient size to support from one to three higher-order LP modes in addition to the fundamental mode. The "Enhanced Single-Mode Fiber" ("ESMF") of the invention, like the perturbed multi-mode fiber of the prior art, depends on a series of perturbations to facilitate mode coupling, but spaces perturbations to deliberately couple the highest-order guided mode with an unguided or "cladding mode" and, so, to induce radiation of—i.e., to strip—that mode from the fiber.

It remains to restrict that induced selective loss to intended mode(s) to be stripped. Stepwise coupling with lower order modes is of lessening incidence with decreasing mode number, as dictated by the basic nature of the mode coupling phenomenon. The invention provides for enhancing that inherent selectivity by appropriate cross-sectional index profile design—importantly to discourage coupling with the fundamental mode. This is accomplished by taking advantage of the dependence of radial positioning of energy concentration on mode-order—by providing one or more profile "index features," so positioned as to selectively change the effective index-of-refraction of a particular mode. Increasing index of the fundamental mode, relative to that of the second mode, lessens likelihood of coupling and reduces loss of the fundamental mode.

A variety of other profile features—dimensional or compositional—more abrupt, or otherwise departing from the primary profile design—may advance the fundamental objective, or serve additional purposes. Features may aid in assuring microbending and macrobending performance to meet specification requirements, e.g., performance equal to that required of traditional single-mode fiber.

ESMF—in its simplest form, of conventional step-index or continuously-profiled-index core—now of increased core size, and consequently of increased MFR, as compared with traditional single-mode fiber—exhibits operating advantages due to lessened impact of nonlinearities, such as 4-Wave Mixing and Stimulated Brillioun Scattering. Other advantages, also related to larger core size, include improved production yield and ease of installation. Illustratively, in terms of a common silica material/fiber design, core radius may be increased from a characteristic value of 4.5 microns ($\mu$m), for traditional single-mode fiber (TSMF), to 8.8 $\mu$m for a representative ESMF design—equivalently, MFR may be increased from 5.8 $\mu$m to 8.0 $\mu$m, both as measured at a wavelength of 1550 nanometers (nm)—without significantly impacting other fiber parameters. (The size relationship between MFR and core size is described, e.g., in "Optical Waveguide Theory", A. W. Snyder and J. D. Love, chapter 15—Chapman Hall, 1983.)

The major thrust of the invention has been described—accommodation of a larger-than-conventional core in a single-mode fiber. Means for maintaining the various forms of loss, to enable the new fiber to meet specification requirements for conventional fiber, are provided for. Accordingly, the new fiber may be incorporated in state-of-the-art circuitry without further improvisation. ESMF, with its large core, has values of chromatic dispersion more nearly approaching bulk values—values sufficient to lessen limitations of 4 Photon Mixing. Provided with dispersion-compensating fiber, for controlling pulse-spreading, it readily meets circuit requirements.

Description includes incorporation of "dispersion-management" features, which may provide ESMF with the small but critical values of linear dispersion associated with now-prevalent Non-Zero Dispersion Fiber (e.g., the 1.5–8.0 ps/nm-km dispersion of TrueWave® fiber), employed in Wavelength Division Multiplexing (WDM) systems.

TERMINOLOGY
(Meanings of Terms, Always Consistent with Common Usage, are Sometimes More Specific.)

ESMF (Enhanced Single-Mode Fiber)—Designation for the inventive fiber.

Mode—Independent, self-supporting, electromagnetic field, constituted of an electric field component and a magnetic field component, that propagates axially along the optical fiber independent of all other modes. Generally intended linearly polarized modes are identified in accordance with the convention, $LP_{mn}$, in which "m" is the azimuthal mode number and "n" is the radial mode number.

Consistent with common practice, "mode", is sometimes used as synonymous with "mode group" where suitable, e.g., where phase-velocity is described and modal members of the group are of the same phase-velocity. Unless otherwise specified, the term includes both polarizations.

Mode Group (or Grouping)—Generally refers to "degenerate" mode group, also known as "principal" mode group (next definition).

Degenerate (or Principal) Mode Group (or Grouping)—For all but the single-member fundamental mode group, constituted of separate member modes, initially of the same axial phase velocity—the term is also applied to such groupings after "splitting", in which member modal phase velocities are no longer the same. Groupings are constituted of a meridional and/or helical mode, together with one or more skew modes.

Multimode Fiber—Fiber of core size sufficient to support a plurality of bound modes—characteristically from several hundred to 2000 modes—in addition to the fundamental mode.

Few-Mode Fiber—Fiber of core size sufficient to support a small number of higher order modes, illustratively from two to four modes including the fundamental mode. ESMF is constituted of Few-Mode Fiber.

Mode Coupling (or Mode Mixing)—Constituting, or entailing, conversion of one mode to another, e.g., as from a bound mode to a cladding mode, or from one bound mode to another bound mode.

Mode Stripping—Elimination of modal energy contained in one or more modes by radiation from the fiber—accomplished by coupling of a bound mode to a cladding mode.

Perturbation—Change in fiber characteristic which locally alters effective refractive index of concerned mode(s) from that in immediately preceding and succeeding fiber length, thereby provoking mode coupling—without modifier, referring to deliberately introduced changes. Study of perturbations—those constituting change in composition as well as geometry—is at an advanced level, and is reported, e.g., in "Optical Waveguide Theory", A. W. Snyder and J. D. Love, chapter 18—Chapman Hall, 1983.

Continuous Relationship—Within prescribed limits, an unabrupt relationship between parameter values. Used in this description, with reference to the relationship between index-of-refraction and radial position in the ESMF core, "continuous relationship" is descriptive of the constant-index step-core or continuously varying profiled-core of common commercial fiber, and is intended to exclude any deliberate abrupt changes (or "features").

Excepting the on-axis index depressions characteristic of MCVD and OVD, state-of-the-art fiber manufacture permits core index values that vary from those prescribed by no more than 10% $\Delta$ over any radial distance $\leq 1$ $\mu$m. This practice assures the defined "continuous relationship".

Feature (or Index Feature)—As referring to the index vs. radial position profile of an optical fiber, any region contained either in the core or cladding, of changed index-of-refraction relative to a hypothetical fiber without such region—i.e., relative to a fiber in which index value is extrapolated from adjoining core or cladding. A form of contemplated feature required by the teaching is bounded by at least one interface consisting of a change in index $\geq 10\%$ $\Delta$, preferably as occurring over a radial distance $\leq 1$ $\mu$m.

Trench (or Index Trench)—Radially positioned, cladding feature of reduced index-of-refraction.

Cupola—Radially positioned, core feature of increased index-of-refraction. The name is derived from the on-axis location of a prototypical structure.

Effective Optical Index ("$n_{\mathit{eff}}$")—a computed value often used in describing mode (or mode group) properties, in accordance with:

$$n_{\mathit{eff}} = \beta/2\pi/\lambda \qquad \text{Eq. 1}$$

in which:
   $\beta$ is the axial phase propagation constant
   $\lambda$ is wavelength measured in free space.
The divisor, $2\pi/\lambda$, usually designated "k", is the wave number of the light.

Group Index—Derivative of $\beta$ with respect to k (with $k=2\pi/\lambda$, in which $\lambda$ is wavelength as measured in free space).

Core—Innermost region of the fiber with primary responsibility for guiding—constituted of material of greater index-of-refraction than that of the cladding within which it is enclosed. A common silica-based fiber structure has a germania-doped core within an undoped cladding.

The radial dimension of the core is ordinarily considered to be the dimension from the center of the fiber to the radially-measured onset of material of index equal to or less than that of the outer cladding—i.e., of index equal to or less than the "predominant cladding index", $n_{cl}$.

$\Delta$ (or Fiber Delta)—A measure of the guide strength of the fiber, in accordance with:

$$\Delta = (n_{co}^{max} - n_{cl})/n_{co}^{max} \qquad \text{Eq. 2}$$

in which:
   $n_{co}^{max}$ = maximum refractive index in the core
   $n_{cl}$ = predominant refractive index of the cladding
Members of the primary class of fiber structures contemplated have $\Delta$ values characteristically within the range of 0.15% to 2.0%.

$\alpha$ Profile—Power law profile for equalizing phase velocities of bound modes—which, as defining the fiber core, follows the relationship:

$$n^2(r) = (n_{co}^{max})^2 (1 - 2\Delta \cdot (r/a)^\alpha)$$

in which:
   n(r) = refractive index at radial position, r
   r = radial position as measured from the fiber axis
   $n_{co}^{max}$ = maximum value of refractive index in the core
   $\Delta = (n_{co}^{max\ 1-n} {}_{cl})/n_{co}^{max}$
   $\alpha$ = core radius Consistent with common design practice, discussion is in terms of the mathematically precise, prototypical, $\alpha$ profile, which is only approached in real structures. The following two definitions quantify encountered deviations which may be tolerated while still, to significant extent, realizing fiber properties associated with the prototypical profile. Accordingly, requirements for "$\alpha$ profile", as used herein, are satisfied by profiles within the bounds of either of the two following definitions, "Near-2 $\alpha$ Profile" and "Best Fit $\alpha$ Profile".

Near-2 $\alpha$ Profile—Power law profile of general form approximating that defined under "$\alpha$ profile", in which the value of the exponent, $\alpha$, approaches 2, resulting in substantial improvement in lessening differences in modal group phase velocities relative to those in constant-index cores. For purposes of this description, this art-accepted term is set at a value in the range, 1.5–3.0.

Best Fit $\alpha$ Profile—Idealized $\alpha$ profile most closely approximating the actual profile, while disregarding deviations from Eq. 3, e.g., as unintentionally introduced during fabrication. (If such deviations are small compared to the operating system wavelength, as is often true of the "ripples" associated with the layered deposition of MCVD and OVD, guidance and transmission properties determined using "best fit" are generally accepted by system designers as descriptive of operation. By the same token, the "central dip"—the axial region of lowered index—associated with MCVD and OVD, while likely larger, has substantial effect only on the fundamental mode, so that the "best fit", ignoring the dip, offers a valid approximation for fiber design/operation.) Ignoring the central dip, core profiles with all index values ±2.5% $\Delta$ of a mathematically perfect $\alpha$ profile qualify for description by "best fit".

Consistent with usual practice, specification of "ax profile" without modifier, as used in the description of a real fiber, is satisfied by a "best fit $\alpha$ profile".

Mathematical methods for determining best fit $\alpha$ profile are described, e.g., in A. H. Cherin, *An Introduction to Optical Fibers*, 1983, McGraw Hill, Chapter 8, Section 8, p. 208.

Cladding—The entirety of the fiber outside the core—in accordance with general usage, referring to the cladding produced during fiber drawing as an integral part of the fiber—not including applied protective coating(s).

Outer Cladding—Without further modifier, the outermost part of the cladding and, generally, the major part of the fiber mass. In the usual instance of silica-based fiber using updoped core material (e.g., germania-doped silica), the outer cladding is undoped silica. In common structures, the refractive index of the outer cladding is the "predominant" value used in calculation of fiber delta ("$\Delta$"), which is used as a measure of fiber guide strength.

DETAILED DESCRIPTION

General

An undesirable implication of mode-mixing, induced by deliberately-introduced perturbations in index-of-refraction along the fiber, has, in the past, prevented general use of that technique for reducing mode dispersion in multimode fiber. Mode-coupling of core modes, to "average" their velocities, has been accompanied by added insertion loss due to unwanted coupling of core modes to cladding modes, with resulting radiation loss. In accordance with the invention, that same radiation loss phenomenon is now deliberately induced in order to strip multimode fiber of second and higher order modes, leaving only the fundamental mode, and, in this manner, to enable its use for single-mode operation.

At the same time, ESMF design provides for the added loss threatened by unwanted mode-coupling—recognizes need for isolating the fundamental mode, so as to prevent its conversion to a cladding mode with resulting expulsion by radiation. This is accomplished by providing one or more profile index features for distancing effective index values selectively as between the fundamental and second mode—for increasing that $\Delta n_{\mathit{eff}}$ value—so as to lessen likelihood of coupling the fundamental mode (to be retained), with higher order bound modes (that are to be stripped).

Information for implementing the invention is available in the technical and patent literature. It includes: a wide variety of methods for introducing fiber perturbations; factors concerning perturbation shape; and, although not of general consequence for prior-art purposes, even principles upon which perturbation spacings may be tailored to induce selective coupling of specified mode pairs—i.e., as required by the invention to enhance the stripping mechanism on which it depends.

It remains only to apply information developed for avoiding radiation loss—to the invention purpose of (selectively) inducing that "loss".

Core size of the inventive fiber is intermediate that of usual multimode fiber with its 25–35 μm core radius, and traditional single-mode fiber with its 4–6 μm radius core. Effective isolation of the fundamental mode—prevention of fundamental-to-higher-mode coupling—in order to lessen loss of fundamental mode energy, is assured by providing one or more core features for increasing $\Delta n_{\mathit{eff}}$ for that transition relative to that of higher mode pairs. Specification of a "few-mode" fiber—one of core size to support a total of from two to four LP bound modes, including the fundamental mode—comes about from the tradeoff between increasing power capability and decreasing stripping selectivity for increasing core size. Assuming present-day design/composition, contemplated "few-mode" fiber, optimized for 1550 nm operation, is of 6–14 μm core radius.

Design principles of the invention are not wavelength specific. Fiber designed for operation at any of the usual single-mode-operating wavelengths of 1310 nm and 1550 nm, as well as at intermediate values, is contemplated. (Operation at intermediate wavelength values becomes feasible with near elimination of the usual water peak, centered at 1385 nm in silica fiber, as described and claimed in U.S. Pat. No. 6,131,415 issued Oct. 17, 2000, and U.S. Pat. No. 6,205,268 issued Mar. 20, 2001.) It is anticipated that fiber of the invention will be utilized at shorter wavelength as well—e.g., at λ=850 nm, as used in today's LAN's and for subscriber access systems. A total wavelength range of from 600–1700 nm is contemplated.

Principles of the invention may be applied to enable simultaneous or alternative operation at first wavelengths for which the core is of sufficient size for supporting only the fundamental mode, and for ESMF operation at shorter wavelengths. As an example, fiber, of traditional single-mode core-size for 1550 nm operation, now provided with perturbations for mode stripping and with feature for minimizing loss, is made suitable for single-mode operation at 850 nm wavelength.

Major operating advantages are a direct consequence of lessened impact of nonlinearities accompanying lowered power density (for given total power) for the larger core. Alternatively, or in combination, the larger core may be used to enable higher total power, so permitting longer amplifier spans and/or larger wavelength division multiplexing (WDM) channel sets.

Non-operating advantages may take the form of increased tolerances accompanying larger core—of increased production yield and facilitated installation. Improvement in microbending performance may permit increased fiber-count or smaller cable structures. Ascribed to reduced microbending loss, use of ESMF will now permit cable fiber-count of 3500 and fiber-to-fiber spacing of 140–190 μm for properties comparable to state-of-the-art cable. (By comparison, the ribbon cable structure of FIG. 8, containing state-of-the-art single-mode fiber, may have a fiber count of the order of 200–1000 and a center-to-center fiber spacing of 260 μm.) Improved macrobending performance permits tighter turns and otherwise eases installation.

Implementation

Criteria for satisfying requirements of the invention are known. While the ESMF approach is a sufficient departure from traditional single-mode fiber that future design optimization may be expected, initial implementation needs are satisfied by state-of-the-art design information. It is a purpose of this section to identify that information.

1. Qualification

It is possible, at the outset, to identify eligible fiber designs—fiber which, properly perturbed, may be made to operate single-mode. Here, the fiber designer provides a basis for making the determination, in the form of "V-value":

$$V=(2\pi n_{co}^{max} a/\lambda)(2\Delta)^{0.5}$$

in which:

$n_{co}^{max}$=maximum refractive index in the core
a=core radius
$\Delta=(n_{co}^{max}-n_{cl})/n_{co}^{max}$ V-value, the "normalized frequency parameter", is determinative of the number of permitted modes and of the guidance property of those modes as dependent on the refractive index profile of the fiber. Optical properties, transmission as well as loss, of all fibers of a specified profile shape, e.g., step-index, parabolic-index, etc., are governed by this parameter, "V".

Equation 4 is a summation of a significant part of the information utilized by the designer of state-of-the-art single-mode fiber. In the appropriate weakly guiding approximation, V-value is determinative of optical properties of fibers capable of single-mode operation. The determination has played an important role over the years, e.g., in qualification of fiber to serve for 1550 nm system wavelength use during the widespread industry changeover from 1310 nm—at first in shifting the null dispersion wavelength from 1310 nm (thereby yielding "Dispersion Shifted Fiber" with its null point at 1550 nm); later for building in a small, finite value of chromatic dispersion for effectuating Wavelength Division Multiplex multi-channel operation (thereby yielding the Non-Zero Dispersion Fiber which was to supplant DSF).

In accordance with the present teaching, the parameter may continue to serve for qualification of fiber for ESMF use—specifically for profile design. The requirement for single-mode capability, in traditional single-mode fiber, is simply that $V<V_c$—that the V-value be less than the threshold value, $V_c$, associated with the concerned core profile shape (step-index core, parabolic-index core, etc.). As documented, e.g., in "Optical Waveguide Theory", A. W. Snyder and J. D. Love, Chapman Hall, 1983, each profile shape has an associated $V_c$-value below which single-mode operation is possible (illustrative values are: $V_c$=2.405 for step-index core fiber; $V_c$=3.518 for parabolic-index core fiber).

For V-value to be determinative for few-mode fiber, it is necessary to calculate values analogous to $V_c$-values, now describing threshold values for few-mode, rather than single-mode operation. Calculation for the maximum 4-mode operation yields values of: $V_4$=5.3 for step-index core fiber; $V_4$=7.9 (corresponding to the $LP_{31}$ cutoff) for parabolic-index core fiber.

Importantly, from the standpoint of the invention, V-value may serve as the single criterion to be met by candidate few-mode fiber which, in accordance with the inventive teaching, is made to operate single-mode by virtue of a proper perturbation series.

2. Core Size

Few-mode fiber core size is conveniently expressed in terms of the maximum permitted number of guided modes in accordance with Eq. 4 above.

Fiber of core size to support two modes at the intended operating wavelength offers the largest incremental improvement in power capability. Permitted increased core size—to a nominal maximum of four modes, provides increased manufacturing tolerance. A four-mode fiber, of core radius about twice that of conventional single-mode fiber, properly perturbed, may sufficiently approach traditional single-mode performance to permit general substitution. Preferred ESMF is accordingly defined as being of core size of 4-mode maximum—i.e., of two to four modes including the fundamental mode. In terms of state-of-the-art, silica-based fiber technology, this is equivalent to core radius of 10–12 μm, relative to the usual 4–6 μm of traditional design.

3. Perturbation Design

To serve their purpose, perturbations, of whatever form, must result in a change in effective index, $\Delta n_{\mathit{eff}}$, as "seen" by a traveling light pulse. Co-pending patent application "Optical Fiber Fabrication And Product," Ser. No. 10/407,298, filed on even date herewith and assigned to the assignee of this application, teaches one method for manufacture of perturbed fiber of desirable properties for implementing this invention. In accordance with the co-filed application, the needed series of repeating precisely-spaced perturbations take the form of geometric perturbations, generated by a standing vibrational wave maintained in the fluid region between fiber and preform, during fiber drawing. Consistent with conclusions reached on basis of effort directed to perturbed multimode fiber, the co-filed application achieves reliable coupling with perturbations of small amplitude constituted of small changes in direction (small bends) or of small changes in core size—seen by travelling pulses as a change in effective index-of-refraction, illustratively of value <0.01% Δ. For specification purposes, a series of at least 5 perturbations, of index change in the range of 0.001–0.01% Δ, as measured at the operating wavelength (or "system wavelength", $\lambda_s$), is qualification for perturbations to accomplish coupling—e.g., for stripping—in implementation of the present invention.

The direction of the change in $\Delta n_{\mathit{eff}}$ is of no functional consequence with regard to perturbing influence, itself. Choice, as between positive and negative change, may be based on fabrication expediency, or on effect on other fiber properties.

Best fiber loss characteristics, commensurate with the inventive purpose, is assured by a continuous series of uniform-size, uniformly-spaced perturbations, thereby enabling small individual perturbation size with accompanying relative freedom from added loss due to scattering. The objective is advanced by specifying that the fiber be perturbed over a "substantial" part of a span length—in long distance systems, preferably over at least 90% of the total length of transmission fiber in the span, e.g., between a successive amplifiers.

4. Perturbation Spacing

The parameter, Γ—the spatial frequency of the perturbation series, measured axially along the fiber, relates to the difference in effective index between adjacent mode groups in the fiber in accordance with:

$$\Delta n_{\mathit{eff}} = \Gamma/(2\pi/\lambda)$$

where: $n_{\mathit{eff}}$ is the effective index of a mode, defined to be:
$$n_{\mathit{eff}} = \beta/(2\pi/\lambda)$$

in which, β=axial propagation constant.

The period of axial fiber perturbations, Λ, determines which modes are subject to coupling (determines the magnitude of $\Delta n_{\mathit{eff}}$ values, and thereby which modes are eligible for coupling)—with decreasing period corresponding with larger values of $\Delta n_{\mathit{eff}}$) in accordance with:

$$2\pi/\Lambda = \delta\beta = (2\pi/\lambda)\Delta n_{\mathit{eff}} = \Gamma.$$

For purposes under discussion, perturbations are commonly spaced at distances of 50–1000 μm, as measured axially along the fiber.

5. Fiber Profile Type

Principles of the invention are applicable to any of the usual fiber profiles. Much of the reported work was conducted with fiber of simple step-core structure. Profile may be of some particular consequence for few-mode cores supporting more than two modes. It is a fundamental property of fiber core of α=2 profile, that probability of coupling between members of successive mode pairs is equal (paired members are spaced by equal values of $\Delta n_{\mathit{eff}}$)—of interest here for the reason that any mode-coupling incident is likely to lead to the desired coupling to a cladding mode. Such profile is further desirable in that it provides for small individual $\Delta n_{\mathit{eff}}$ values, thereby increasing permitted perturbation-spacing, in turn resulting in more rapid mode-coupling. More rapid mode-coupling enhances the intended radiation loss mechanism, and results in fiber properties more closely approaching those of traditional single-mode fiber.

Regardless of basic fiber profile, it continues to be required that at least one fiber feature be included for increasing $\Delta n_{\mathit{eff}}$ value for the $LP_{01}$–$LP_{11}$ mode pair, in order to avoid unwanted loss of fundamental mode energy, as discussed in Section 6.

Satisfactory macrobending and microbending performance are assured by optimization of certain modal parameters.

Good macrobending performance is assured by a propagation constant for the fundamental mode which is above a critical value:

$$\beta_{01} - (k_0 \cdot n_{cl}) > B_{crit\ macro} \qquad \text{Eq. 7}$$

in which, $\beta_{01}$ is the axial propagation constant of the fundamental mode, $k_0 = 2\pi/\lambda$ (the wave number of light in vacuum), $n_{cl}$ is the index-of-refraction of the cladding, $B_{crit\ macro}$ is the critical value specified.

Good microbending performance requires a minimum specified difference between the values of the propagation constant, $\beta_{01}$, for the fundamental and the succeeding mode, generally, but not invariably, the $LP_{11}$ mode, with $\beta_{11}$ in accordance with:

$$\beta_{01} - \beta_{11} < B_{crit\ micro}$$

in which, $\beta_{01}$ is the axial propagation constant of the fundamental mode, $\beta_{11}$ is the axial propagation constant of the second mode, $B_{crit\ micro}$ is the critical value specified.

In following discussion, emphasis is often on certain of the fiber operating properties enhanced by substitution of ESMF for TSMF, so that only those enhanced properties are quantified. With respect to operating properties not so enhanced, state-of-the-art practice permits ESMF values at least equal to those of the TSMF to be displaced. Such values are realized in numbered examples. Provision for critical loss-determining properties in this category follows:

$B_{crit\ macro}$ (ESMF) ≧ $B_{crit\ macro}$ (TSMF) at 1550 nm (present practice permits specification of a value ≧0.012 for any operating wavelength within the contemplated operating range);

$B_{crit\ micro}$ (ESMF) ≧ $B_{crit\ micro}$ (TSMF) at 1550 nm (present practice permits specification of a value ≧0.008 for any operating wavelength within the contemplated operating range).

Requirements for a category of TSMF, desirably to be satisfied by ESMF, are set forth:

Macrobending

| | |
|---|---|
| induced attenuation <0.5 dB | for one 32 mm diameter turn at $\lambda_0 = 1550$ mm |
| induced attenuation <0.10 dB | for 100 50 mm diameter turns at $\lambda_0 = 1550$ mm |
| induced attenuation <0.05 dB | for 100 50 mm diameter turns at $\lambda_0 = 1310$ mm |

Fiber Loss maximum attenuation 0.34 to 0.39 dB/km at $\lambda_0 = 1310$ mm
maximum attenuation 0.19 to 0.23 dB/km at $\lambda_0 = 1550$ mm Wavelength-Dependent Variation of Fiber Loss maximum of 0.05 dB/km over wavelength range from 1285 to 1330 nm
maximum of 0.05 dB/km over wavelength range from 1525 to 1575 nm Effective mode stripping is assured by maintaining a value of axial propagation constant, for the second mode, $\beta_{11}$, in accordance with:

$$\beta_{11} - (k_0 \cdot n_{cl}) < B_{strip}$$

in which, $\beta_{11}$ is the axial propagation constant of the second mode, $k_0 = 2\pi/\lambda$ (the wave number of light in vacuum), $n_{cl}$ is the index-of-refraction of the cladding, $B_{strip}$ is the critical value determined by perturbation-to-perturbation spacing.

This parameter, $B_{strip}$, of magnitude varying inversely with operating wavelength, is unique to ESMF. For advice of the system designer, state-of-the-art manufacturing practice permits specification as follows:

$B_{strip}$ (ESMF), <0.006 at $\lambda_0 = \lambda_{min}$, where $\lambda_{min}$ is the lowest contemplated wavelength of system operation.

6. Profile Features

The prototype fiber profile is based on core and cladding, each of profile defined by a continuous relationship between index-of-refraction and radial position. Deliberate abrupt change ("discontinuous change" in excess of 10% $\Delta$per $\mu$m) has been reserved for possibly defining only the core-cladding interface. In accordance with the inventive teaching, other discontinuous changes in the profile define "features". ESMF necessarily includes at least one of a first category of features for avoiding unwanted loss of fundamental mode energy. The inventive objective depends on coupling second and higher-order modes, ultimately to cladding modes, while discouraging coupling to the fundamental mode. This is accomplished by features which selectively increase the difference in effective index, $\Delta n_{eff}$, as between the fundamental mode and the second mode.

It is fundamental that the radial position of peak energy for a mode depends on mode number—with position increasing radially outward with increasing mode number. One or more fiber features, each ideally of radial extent corresponding with that of region of prevalence of the mode(s) to be affected, is positioned accordingly to selectively affect the desired mode(s). By introducing a "cupola"—a region of increased index on or near-axis—the effective index of the fundamental mode is selectively increased, with accompanying selective increase of associated $\Delta n_{eff}$ value. For most effective operation, this "positive" feature is largely contained within the fiber core—does not extend into the cladding. The cupola, since increasing the effective index of the fundamental mode, has the further effect of lessening macrobending sensitivity.

Provision of a "negative" feature radially beyond the fundamental mode peak, at or near the position of peak energy for the second mode, lessens the effective index of the second mode relative to the fundamental mode. Such a "trench" also increases $\Delta n_{eff}$ between first and second modes, and may serve that purpose in lieu of or in combination with a cupola. Claimed fiber includes such positive and/or negative feature.

Figure 1:
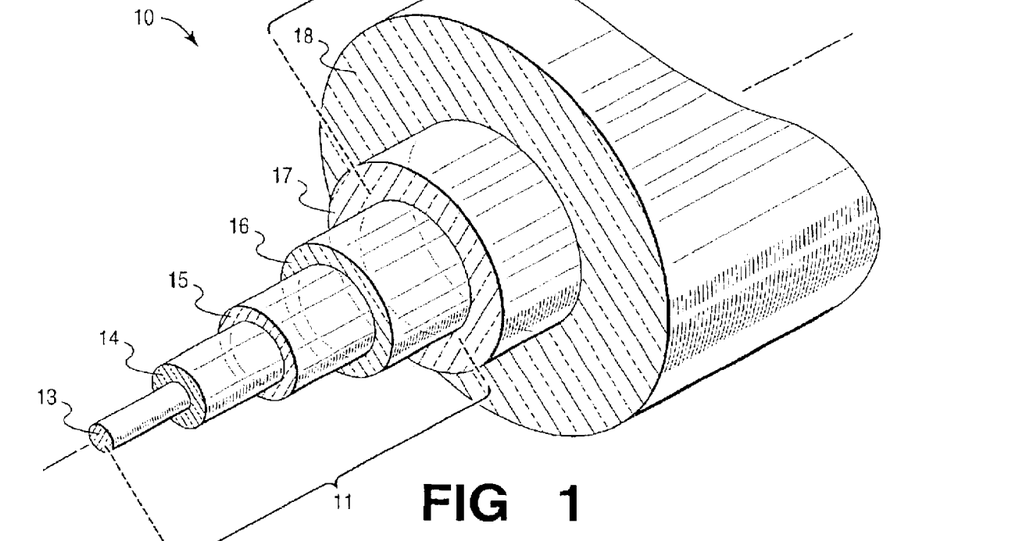
FIG. 1 is a perspective view of an illustrative ESMF structure.
Figure 2:
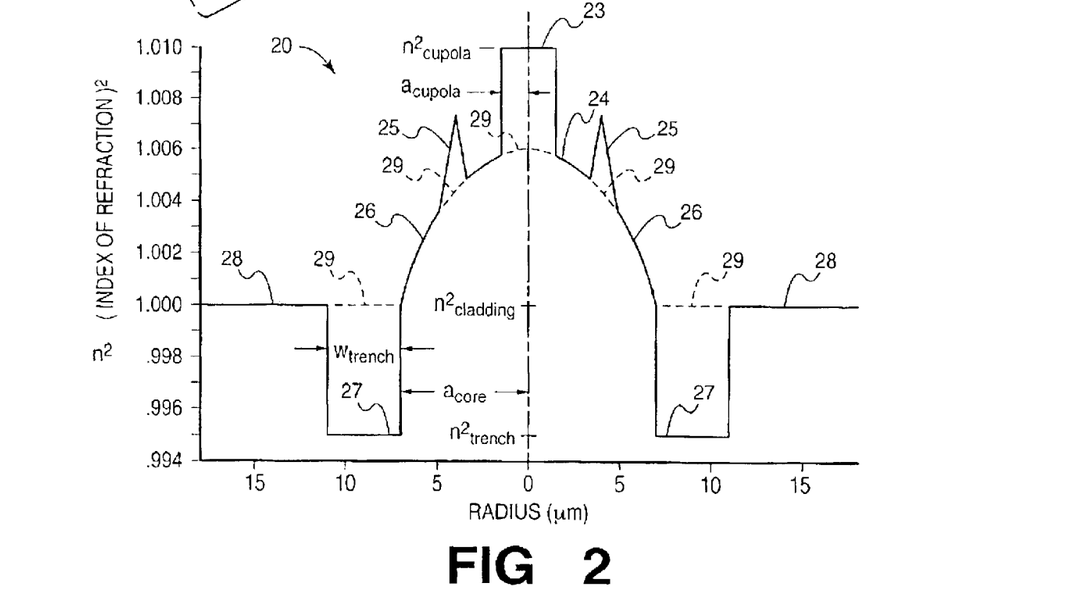
FIG. 2, on coordinates of index-of-refraction and radius, is a cross-sectional index profile for an illustrative ESMF structure of design optimized for long-haul transmission.
Figure 3:
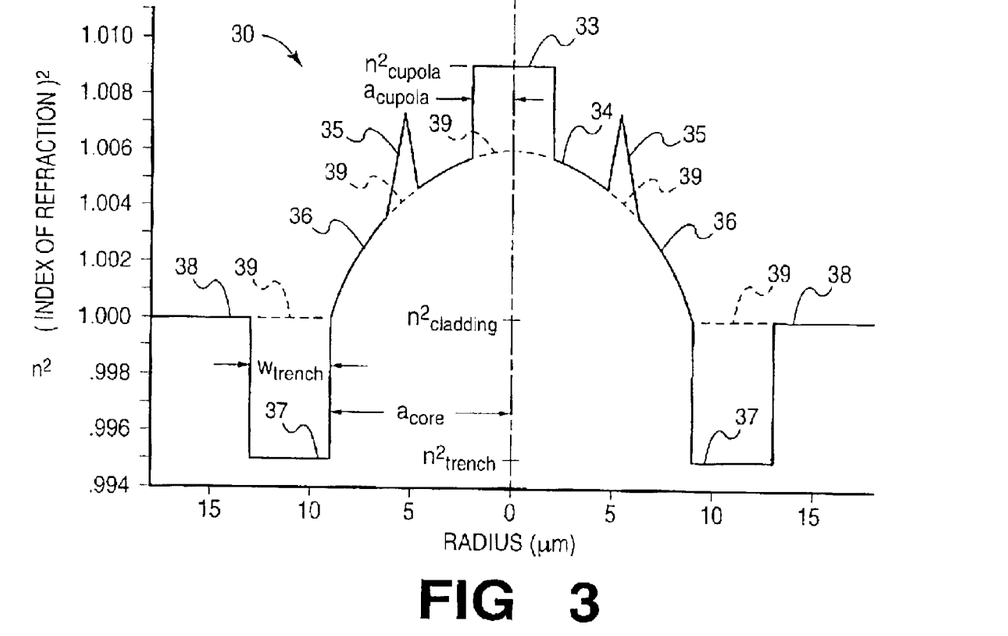
FIG. 3, on coordinates of index-of-refraction and radius, is a cross-sectional index profile for an illustrative ESMF structure of design optimized for Metropolitan (intermediate distance) transmission.
Figure 4:
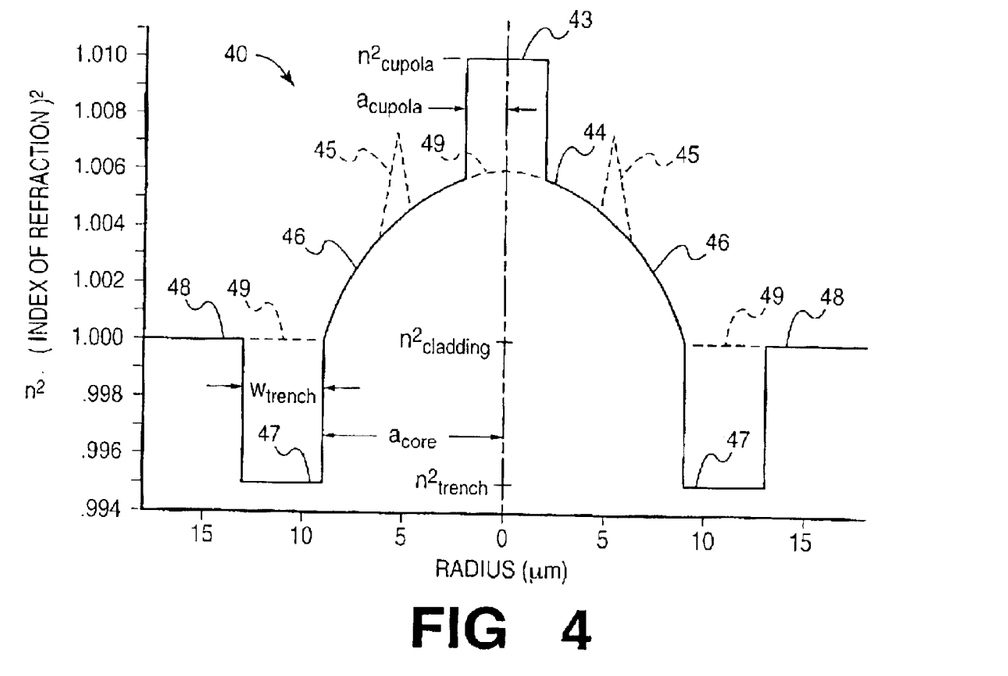
FIG. 4, on coordinates of index-of-refraction and radius, is a cross-sectional index profile for an illustrative ESMF structure of design optimized for Access and Enterprise (local network) transmission.

FIG. 1 is a perspective view of an illustrative ESMF structure. FIGS. 2–4 show three index profile variations of the fundamental ESMF design of FIG. 1, with fiber features optimized, in that order, for: long haul; metropolitan; and access and enterprise use. To expedite discussion, corresponding features of successively numbered figures are numbered in successive decades (e.g., with feature 17 of FIG. 1 corresponding to features 27, 37, and 47 of FIGS. 2, 3, and 4, respectively).

The fiber 10 of FIG. 1, consisting of core 11 and cladding 12, is, for purpose of illustration, further provided with one each of the three categories of fiber features, which, taken singly or in combination, enable design of ESMF meeting specification requirements—importantly, for satisfying loss characteristics required of the ISMF it replaces.

Corresponding with the index profiles of FIGS. 2–4, core 11 is shown as including "normal" or "unfeatured" core regions 14 and 16 together with features 13 and 15, while cladding 12 is shown as provided with feature 17. As such, FIG. 1 shows both an index-increasing feature 13 in the core (a cupola), and an index-reducing feature 17 in the cladding (a trench). The depicted structure additionally includes an illustrative dispersion tailoring feature 15—discussed in the present description under the heading "7. Dispersion Tailoring". ESMF including such a feature—e.g., to satisfy NZDF requirements—represents a preferred embodiment of the invention.

FIGS. 1–4 are for purpose of discussion—are representative of real structures, in which features are likely defined by somewhat more diffuse boundaries, and in which profiles likely only approximate the simple geometric shapes depicted. This is true, in particular, of feature 15, which is optimally of shape and position which varies with fiber design.

Some attempt has been made to scale depicted fiber features in accordance with real structures—particularly those which are varied among the fibers of FIGS. 2–4. Nevertheless, depicted figure-to-figure variants should be viewed as general design considerations rather than for their precise magnitudes. Future developments may favor different feature emphasis. The dispersion tailoring feature 15 is, again, an example—while likely to remain a positive index influence (to locally increase index-of-refraction), and likely to maintain its approximate radial position—may become more prominent in order to provide the increased dispersion needed to accommodate larger channel sets.

Each of the descriptions of FIGS. 2–4 includes discussion of specification requirements now made of TSMF to be replaced, as well as fiber features to enable ESMF to meet those same requirements. Each is followed by an Example.

Long Haul ESMF Design

FIG. 2 is an illustrative cross-sectional, index-of-refraction, profile serving for discussion of ESMF serving for long haul transmission—e.g., for the amplifier spans typically ≧75 kilometers (km) as used in state-of-the-art long-distance telephony. Coordinates are: radial distance from the fiber axis in microns (μm) on the abscissa; and $n^2$, the second power of the index-of-refraction (relative to vacuum), on the ordinate. Constituent parts correspond with those shown in FIG. 1, and, accordingly, include features: cupola 23, trench 27, and dispersion management feature 25. For purpose of discussion, the fiber may be considered as derived from TSMF, in which ESMF features replace dashed line regions 29. (Such TSMF would be constituted of core 29-24-29-26, within cladding 29-28—illustratively depicted as an unfeatured 2α profiled fiber.)

Recited properties of the FIG. 2 ESMF assume operation at the nominal wavelength value of 1550 nm. Single-mode operation, equivalent in loss performance to that of TSMF (over the commonly-specified wavelength operating range of 1525–1575 nm), is attainable by design in accordance with:

TABLE 1

Long Haul ESMF parameters

| | |
|---|---|
| core radius, $a_{core}$ | 4–8 μm |
| $n^2_{cupola}$ | $1.008–1.020 n^2_{cladding}$ |
| cupola radius, $a_{cupola}$ | 0.5–2 μm |
| $n^2_{trench}$ | $0.998–0.992 n^2_{cladding}$ |
| trench width, $w_{trench}$ | 2–6 μm |

Both the table and following example relate to the preferred embodiment including both a cupola and trench. Use of a single such feature, as well as broader use of the invention—e.g., for fiber of relaxed macrobending and/or microbending characteristics—is not precluded.

EXAMPLE 1

A fiber of the profile of FIG. 2, is viewed as derived from an unfeatured fiber of near-2 α profile with cladding of undoped silica—accordingly $n^2_{cladding}=1$. Parameter values, in the order listed in Table 1, are: $a_{core}=7$ μm, $n^2_{cupola}=1.01$, $a_{cupola}=1.5$ μm, $n^2_{trench}=0.995$, $w_{trench}=4$ μm. Operating at carrier wavelength, $\lambda_0=1550$ nm, MFR=6.5 μm with macrobend and microbend loss performance equal to or better than that of TSMF.

Metro ESMF Design

FIG. 3 is a cross-sectional, index-of-refraction, profile plot considered in discussion of ESMF for medium and short distance transmission. With span lengths no greater than 50 km, concern for fiber insertion loss is lessened, so that operation over a broadened wavelength range becomes viable. The operating range now includes that associated with the nominal carrier, $\lambda_0=1310$ nm, so resulting in a total range of 1100–1700 nm (excepting a range centered at the 1385 nm water peak if not eliminated). Coordinates are those of FIG. 2—radial distance from the fiber axis in microns on the abscissa; and $n^2$, the second power of the index-of-refraction (relative to vacuum), on the ordinate. Constituent parts of fiber 30 correspond with those shown in FIG. 1, and, accordingly, include features: cupola 33 and trench 37. Optional dispersion management feature 35—discussed in subsequent section "7. Dispersion Tailoring"—is included.

As with FIG. 2, the fiber may be considered as derived from TSMF, in which features are replaced by dashed line regions 39, i.e., from fiber constituted of core 39-34-39-36, within cladding 39-38 (both as proceeding outwardly from the fiber axis)—illustratively depicted as of 2 α profile, a preferred embodiment. High insertion Loss in the $\lambda_0=850$ nm band, used in local transmission, generally limits operation to $\lambda_0 \geq 1100$ nm (so that the fiber need not be single-mode below that wavelength). Single-mode operation, equivalent in loss performance to that of TSMF (at 1575 nm), is assured by design in accordance with:

TABLE 2

Metro ESMF parameters

| | |
|---|---|
| core radius, $a_{core}$ | 6–12 μm |
| $n^2_{cupola}$ | $1.006–1.012 n^2_{cladding}$ |
| cupola radius, $a_{cupola}$ | 0.5–3.0 μm |
| $n^2_{trench}$ | $0.997–0.993 n^2_{cladding}$ |
| trench width, $w_{trench}$ | 3–6 μm |

As with Long Haul ESMF, both Table and Example relate to the preferred embodiment including a cupola together with a trench. Use of one or the other, singly, as well as broader use of the invention—e.g., for fiber of poorer macrobending and/or microbending characteristics—as: satisfactory for particular purpose, is not precluded.

EXAMPLE 2

A fiber of the profile of FIG. 3, is viewed as derived from an unfeatured fiber of near-2 α profile with cladding of undoped silica—accordingly $n^2_{cladding}=1$. Parameter values, in the order listed in Table 2, are: $a_{core}=9$ μm, $n^2_{cupola}=1.009$, $a_{cupola}=2.0$ μm, $n^2_{trench}=0.995$, $w_{trench}=4$ μm. Operating at carrier wavelength, $\lambda_0=1110$ nm, MFR=7.5 μm: at $\lambda_00=1550$ nm, MFR>8.2 μm.

Access and Enterprise ESMF Design ("Local Transmission")

FIG. 4 is a cross-sectional, index-of-refraction, profile plot considered in discussion of ESMF for local transmission—e.g., for span length typically ≦10 km. Likely of lesser commercial significance than long haul or metro, local ESMF is included for the possibility that its very broad single-mode operating range may finally lead to replacement of multimode fiber now commonly used in systems designed for operation at $\lambda_0=850$ nm. As in FIGS. 2–3, coordinates are: radial distance from the fiber axis in units of μm on the abscissa; and $n^2$, the second power of the index-of-refraction (relative to vacuum), on the ordinate. Constituent parts correspond with those shown in FIG. 1. Accordingly, fiber 40 includes features: cupola 43 and trench 47. An optional, representative dispersion management feature 45 is shown, even though inclusion is unlikely for short system lengths contemplated. For purpose of discussion, the fiber may be considered as derived from TSMF, in which features are replaced by dashed line regions 49, i.e., from fiber constituted of core 49-44-49-46, within cladding 49-48 (both as proceeding outwardly from the fiber axis)—illustratively depicted as of 2 α profile, a preferred embodiment.

While insertion loss is less of an issue for such short system lengths, the broad wavelength range including 850 nm operation puts severe demands on cupola and trench, both of which are likely to be included to assure effective single-mode operation. Single-mode operation, equivalent in loss performance to that of TSMF (at 1575 nm), is assured by design in accordance with:

TABLE 3

| Local ESMF parameters | |
|---|---|
| core radius, $a_{core}$ | 6–12 μm |
| $n^2_{cupola}$ | 1.01–14 1.015$n^2_{cladding}$ |
| cupola radius, $a_{cupola}$ | 0.5–3.0 μm |
| $n^2_{trench}$ | 0.998–0.993$n^2_{cladding}$ |
| trench width, $w_{trench}$ | 3–6 μm |

EXAMPLE 3

A fiber of the profile of FIG. 4, is viewed as derived from an unfeatured fiber of 2 α profile with cladding of undoped silica—accordingly $n^2_{cladding}=1$. Parameter values, in the order listed in Table 3, are: $a_{core}=9$ μm, $n^2_{cupola}=1.01$, $a_{cupola}=2$ μm, $n^2_{trench}=0.995$, $w_{trench}=4$ μm. Operating at carrier wavelength, $\lambda_0=850$ nm, MFR=7 μm at $\lambda_0=1550$ nm, MFR>9 μm.

7. Dispersion Tailoring

Without specific design provision, ESMF, with its larger core, tends toward values of chromatic dispersion approaching bulk values. Provided with appropriate lengths of Dispersion Compensating Fiber, it meets circuit requirements. Initial commercial use may, accordingly, be in conjunction with DCF.

Design means are available for adjusting chromatic dispersion in ESMF to meet requirements of Non-Zero Dispersion Fiber (NZDF), e.g., TrueWave® fiber—e.g., for yielding dispersion within the now-specified range of 1.5–8 ps/nm-km as measured at 1550 nm. Dispersion management features, most effectively situated within the core, are positioned to selectively affect desired wavelength components. Likely of annular form, and taking advantage of wavelength dependence of field penetration, increasing radial spacing of the feature from the fiber axis correspondingly selectively influences wavelength components of increasing wavelength.

Commercial acceptance of ESMF may lead to inclusion of a dispersion management feature. Such a feature may partially compensate for the positive material dispersion of the now-prevalent silica-based fiber, and may yield dispersion value within the NZDF range. Dispersion management features may be of positive or negative index, of magnitude, size and shape as desired.

Additional Figures

Figure 5:
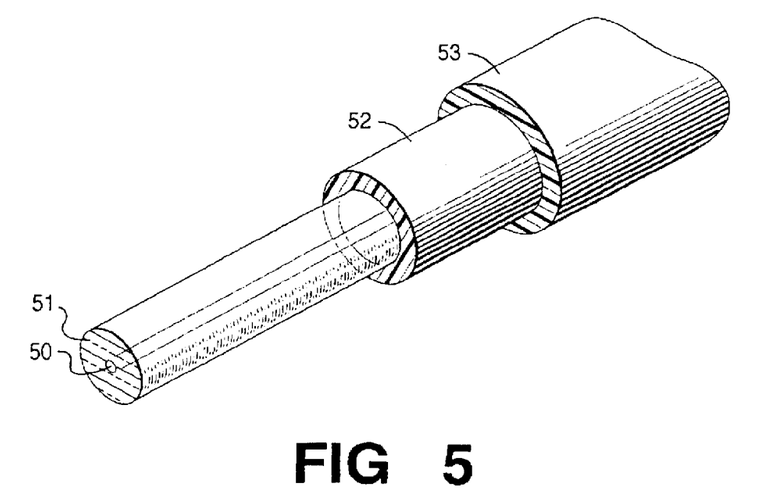
FIG. 5 is a perspective view of an ESMF structure, dual-coated in accordance with conventional practice.

FIG. 5 is a perspective view of an ESMF consisting of a core 50, cladding 51, together with primary and secondary coatings 52 and 53.

Figure 6:
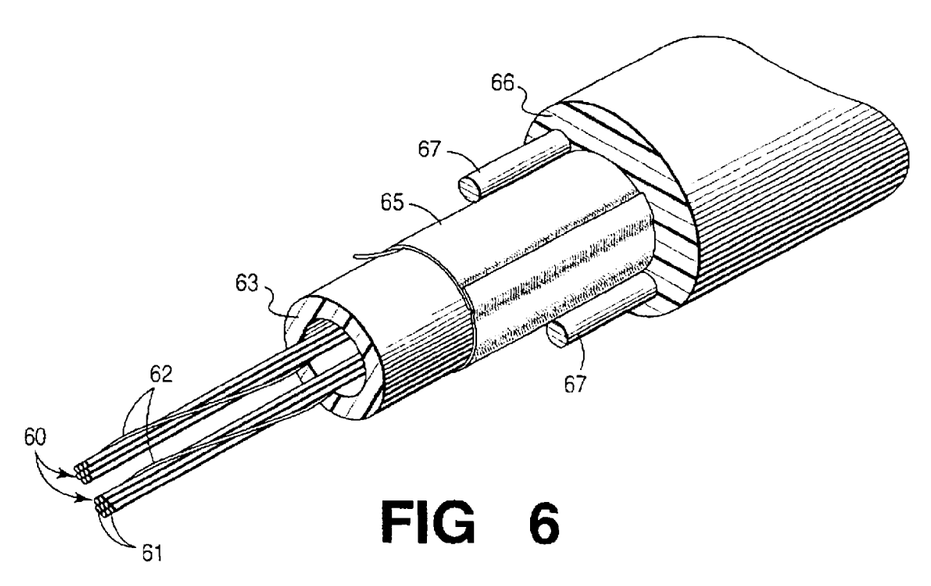
FIG. 6 is a perspective view of one form of cable structure containing grouped ESMFs.

FIG. 6 depicts one form of commercial cable described, e.g., in AT&T Lightguide Cable, December, 1990. It is constituted of two bundles 60, each bundle containing 12 color-coded fibers 61, held together by an encircling winding 62. Individual fibers 61 are of the general design of that of FIG. 5. The complete structure includes core tubes 63, cable-filling compound 64, and two protective structures each constituted of a water-blocking tape 65 and a polyethylene jacket 66, each structure reinforced by steel wires 67.

Figure 7:
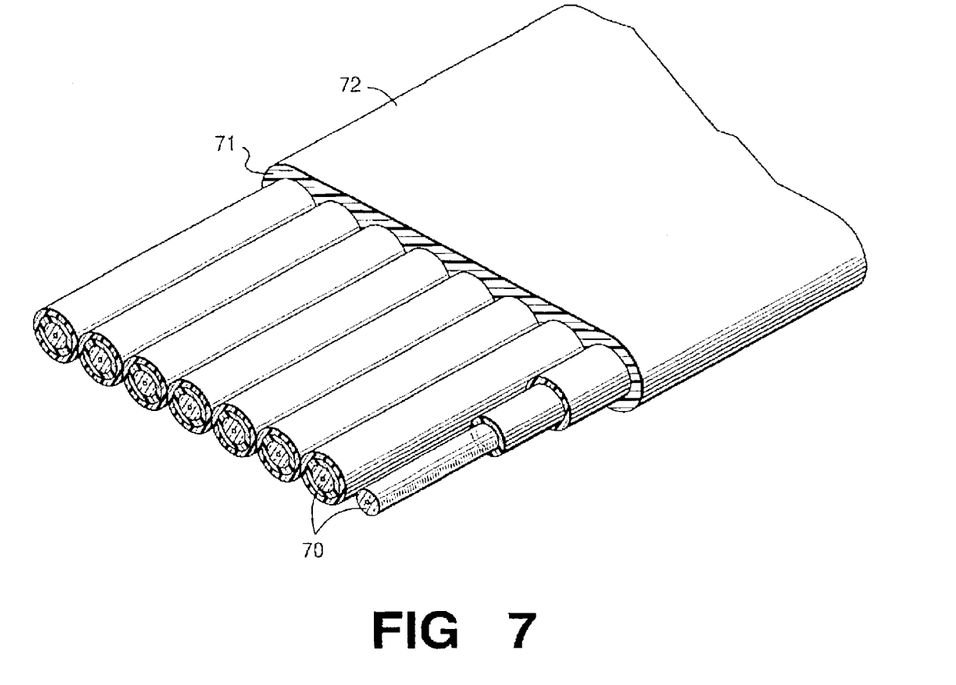
FIG. 7 is a perspective view of an array—an AccuRibbon array—in this instance, containing twelve ESMFs.

FIG. 7 is a perspective view of an AccuRibbon® planar fiber array. Shown are: 12 fibers 70, which may be of the structure of FIG. 5; filler material 71; and sheathing 72.

Figure 8:
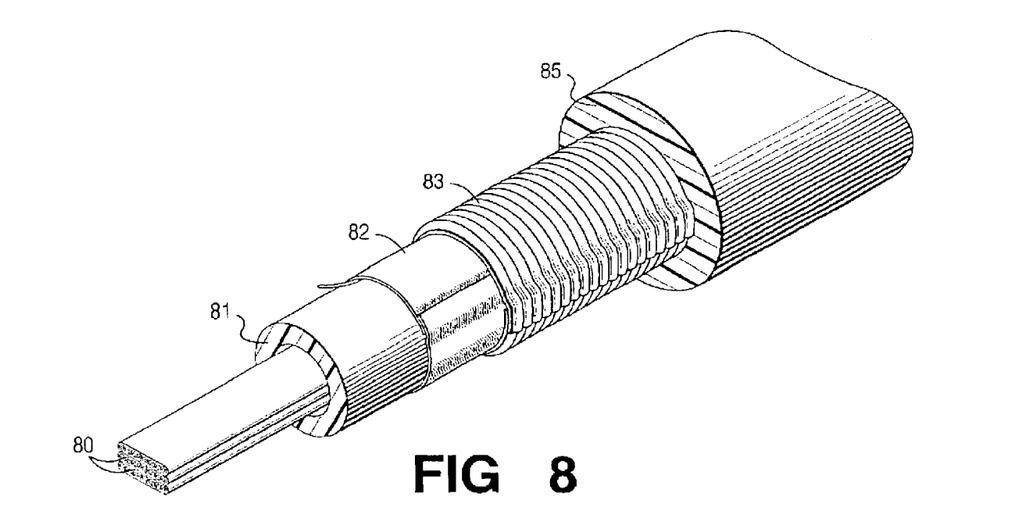
FIG. 8 is a perspective view of a cable containing many of the arrays of FIG. 7.

FIG. 8 shows a cable containing several planar arrays 80, each of the structure shown in; FIG. 7. Crossply sheath 81 is filled with cable-filling compound 82. The particular structure shown is an under-water armored cable, including overwrappings constituting conductive shield 83, and bonded jacket 85.

What is claimed is:

1. Article comprising at least one optical fiber suitable for pulsed single-mode operation with electromagnetic energy of operating wavelength, "$\lambda_o$", the major part of the fiber length being of guide strength, "Δ", as measured at $\lambda_o$ and having a cross-sectional profile comprising a core and a cladding region, Characterized in That the said core region is of sufficient size for supporting at least two linearly polarized modes consisting of the fundamental mode together with from one to three higher-order modes of such energy, and in that the said fiber contains a continuous stream of longitudinally spaced perturbations over a substantial portion of its length, each perturbation constituting a local interruption in fiber guiding properties which induces mode coupling, perturbation spacing being such as to selectively couple said higher-order modes with a cladding mode, thereby resulting in selective extraction of said higher-order modes by radiation, and in which the cross-section profile of the said fiber additionally includes at least one radially positioned index-of-refraction feature for increasing the difference in effective index, $\Delta n_{eff}$, between the said fundamental mode and a said higher-order mode, said feature introducing a radially-defined change in refractive index of peak value $\geq 25\%$ Δ, relative to an unfeatured profile.

2. Article of claim 1 in which the said feature is defined by an "abrupt" index variation of $\geq 10\%$ Δ over a radial distance of <1 μm at an interface with other material in the same fiber region.

3. Article of claim 2 in which the said feature is positioned in the said core region and constitutes a "cupola" of increased index-of-refraction.

4. Article of claim 2 in which the said feature is positioned in the said cladding region and constitutes a "trench" of decreased index-of-refraction.

5. Article of claim 2 in which $\lambda_o$ is in the range of 600–1700 nm.

6. Article of claim 5 in which the core radius is at least about 8.8 μm.

7. Article of claim 5 in which core and cladding index, exclusive of any said feature, is a "continuous function" of radius in which index variation is <10% A over a radial distance of 1 μm.

8. Article of claim 7 in which the core, exclusive of any said feature, is a "step-index" core of nominally constant index-of-refraction.

9. Article of claim 7 in which the core, exclusive of any said feature, is a "profiled-index" core of radially varying index-of-refraction.

10. Article of claim 7 in which the core, exclusive of any said feature, is of best fit alpha refractive index profile in accordance with the relationship:

$$n^2(r)=(n_{co}^{max})^2 \cdot (1-2\Delta \cdot (r/a)^\alpha)$$

in which:
r=radial distance from the fiber axis
n(r)=refractive index at r
$\Delta=(n_{co}^{max}-n_{cl})n_{co}^{max\Delta}$
$n_{cl}$=the predominant refractive index of the cladding
$n_{co}^{max}$=the maximum refractive index of the core
a=core radius,
α being of numerical value within the range 1.5–3.0.

11. Article of claim 1 in which the said perturbations induce a change in effective index-of-refraction for at least one said mode of value within the range 0.1–5.0% Δ.

12. Article of claim 1 in which the said perturbations comprise change in axial fiber direction.

13. Article of claim 1 in which the said perturbations comprise change in cross-sectional radial fiber dimension of at least 0.001 µm.

14. Article of claim 1 in which the said perturbations comprise change in cross-sectional shape.

15. Article of claim 1 in which the numerical value of Δ is at least 0.003.

16. Article of claim 1 in which the said fiber is encompassed within dual coatings including a primary coating in direct contact with the fiber and a secondary coating enclosing the said primary coating.

17. Article of claim 1 including a plurality of optical fibers within a sheathing, so defining a cable.

18. Article of claim 17 including grouped fibers.

19. Article of claim 18 in which grouped fibers consist of groups, each in the form of a planar array.

20. Article of claim 1 comprising reeled product.

* * * * *